Aug. 2, 1966 G. F. SCHMITZ 3,263,419
ATTITUDE CONTROL SYSTEM FOR SPACE VEHICLES
Filed May 23, 1963 2 Sheets-Sheet 1

GERT F. SCHMITZ INVENTOR.

BY

*Roff Williams* ATTORNEY

Aug. 2, 1966 G. F. SCHMITZ 3,263,419
ATTITUDE CONTROL SYSTEM FOR SPACE VEHICLES
Filed May 23, 1963 2 Sheets-Sheet 2

GERT F. SCHMITZ INVENTOR.

BY

*Roh Williams* ATTORNEY

United States Patent Office 3,263,419
Patented August 2, 1966

3,263,419
ATTITUDE CONTROL SYSTEM FOR
SPACE VEHICLES
Gert F. Schmitz, Huntsville, Ala., assignor to Thiokol Chemical Corporation, Bristol, Pa., a corporation of Delaware
Filed May 23, 1963, Ser. No. 282,628
6 Claims. (Cl. 60—35.54)

This invention relates to improvements in attitude control systems for space vehicles and, more particularly, to a solid propellant attitude control system.

With increased space activity, the aerospace industry has need of control mechanisms that will precisely affect the pitch, roll, and yaw of orbital and other space vehicles. Many types of systems have been perfected to achieve space-vehicle control, but none have been able to maneuver the space vehicle with as little effort as the mechanism forming the present invention. The present invention provides a series of directed thrusts which may be initiated as slowly or as rapidly as the situation demands; and because of the particular structure of the mechanism involved, the failure thereof has been reduced to a minimum. There is also an avoidance of any overcorrection of the system.

It is, therefore, an object of this invention to provide an attitude control system that will provide a series of command thrusts that will control the pitch, roll, and yaw of a space vehicle.

With the above and other objects and advantages in view, the invention consists of the novel details of construction, arrangement, and combination of parts more fully hereinafter described, claimed, and illustrated in the accompanying drawings in which:

Figure 1:
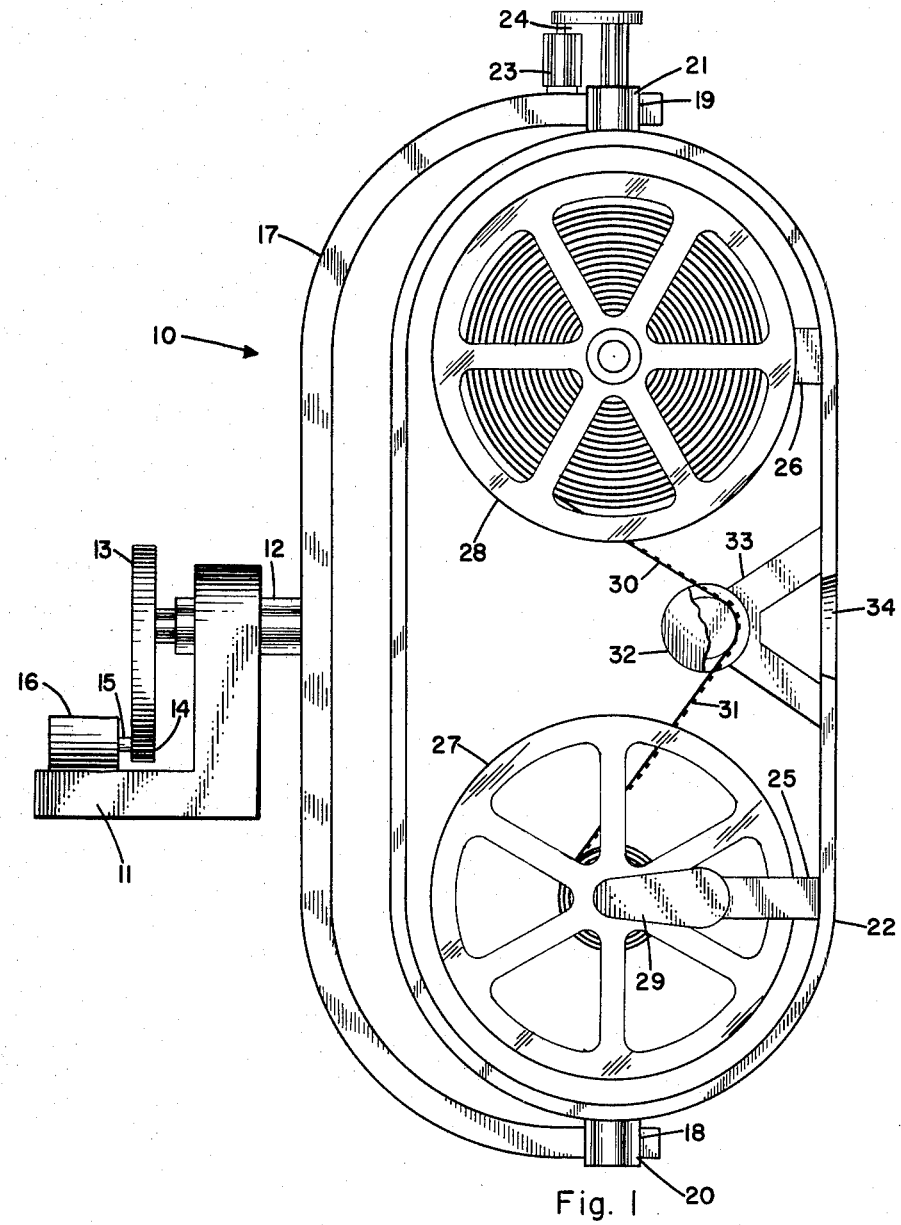
FIGURE 1 is a schematic elevational view, partly broken away, of the attitude control system embodying the invention.

Referring more in detail to the drawings wherein like parts are designated by like reference numerals, the reference numeral 10 is used to designate an attitude control system embodying the present invention.

The control system 10 includes an L-shaped mounting block 11 in which is mounted a gimbal 12. A gear 13 secured to the gimbal 12 meshes with a gear 14 secured to the drive shaft 15 of an electric motor 16 which is secured to the mounting block 11, as shown in FIGURE 1.

Activation of the motor 16 will cause a rotation of 360 degrees of an approximately U-shaped frame 17 which is rigidly secured to the gimbal 12.

The opposite ends of the frame 17 are provided with sockets 18 and 19 respectively that rotatably receive the trunnions 20 and 21 respectively that are integral with the opposite ends of an approximately elliptical-shaped casing 22. Gearing 23 connects the trunnion 19 to a small electric motor 24 that is mounted on the frame 17. The motor 24, when activated, will cause a rotation of 360 degrees of the casing 22 as required.

Extending transversely of the casing 22 are a pair of reel mounts 25 and 26 respectively on which are rotatably mounted a pair of reels 27 and 28 respectively. A small electric motor 29 mounted on the reel mount 25 will cause rotation of the reel 27 in an anti-cock direction as the attitude control system is activated.

A plastic tape 30 is wound on the reels 27 and 28 and a plurality of small solid propellant reaction motors 31 are mounted on the tape 30 in equally-spaced relation to each other.

A peripherally-grooved tape guide 32 is mounted on a substantially conically-shaped mounting 33 that is secured to the inner surface of the casing 22. An exhaust port 34 is provided in the wall of the casing 22 in alignment with the reaction motors 31 on the tape 30 as they pass over the guide 32.

Figure 2:
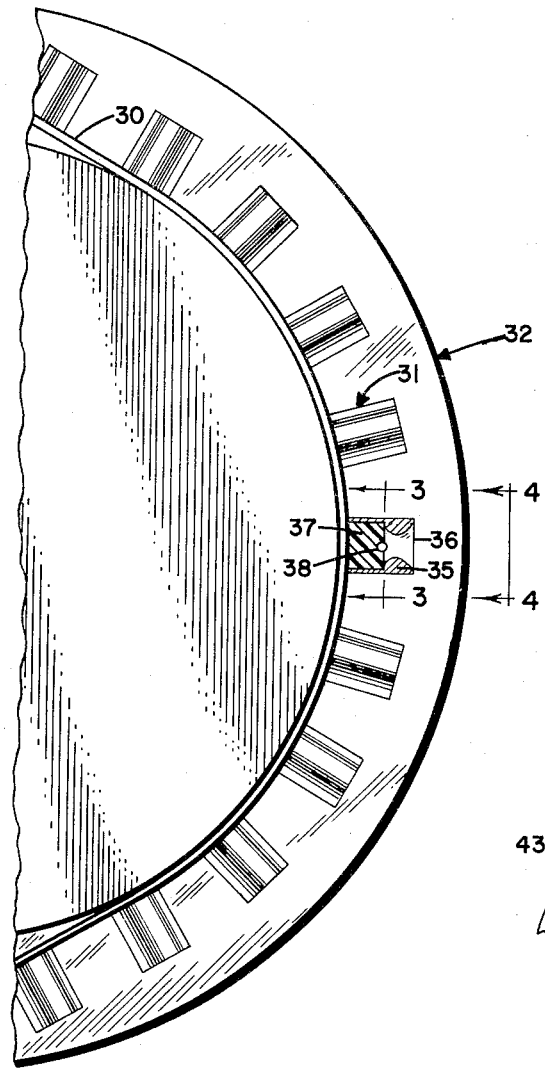
FIGURE 2 is an enlarged elevational view, with parts eliminated and partly broken away, of the peripherally-grooved guide.
Figure 3:
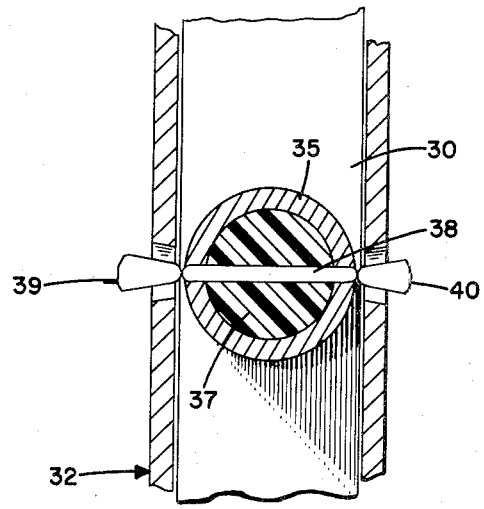
FIGURE 3 is an enlarged fragmentary detailed sectional view on the line 3—3 of FIGURE 2.
Figure 4:
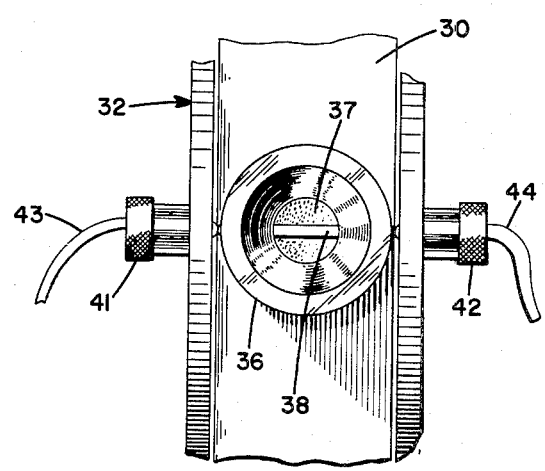
FIGURE 4 is an enlarged fragmentary elevational view on the line 4—4 of FIGURE 2.

The plastic tape 30, reaction motors 31, and tape guide 32 can be more clearly seen in the enlarged views of FIGURES 2 to 4. As can be seen in FIGURE 2, each of the reaction motors 31 includes a motor case 35 that is provided with an integral nozzle 36 and a small amount of solid propellant 37. Extending through and transversely of each of the motors 31 at the surface of the propellant 37 is an ignition wire 38 which has exposed ends, as shown in FIGURE 3.

Electrical contacts 39 and 40 respectively are mounted on the guide 32 adjacent the periphery thereof and in diametrically-opposed relation to each other by housings 41 and 42 respectively. The contacts 39 and 40 are spring-biased so they will wipe the opposite ends of the ignition wire 38. Electrical energy is supplied to each of the housings 41 and 42 by means of leads 43 and 44 respectively so that when the contacts 39 and 40 wipe the opposite ends of the ignition wire 38, an electrical current will be caused by flow through and energize the ignition wire 38.

The attitude control system 10 utilizes small charges of solid propellant mounted on a thin plastic tape. In use, the mounting 11 of the attitude control system 10 is positioned at some predetermined location, preferably one end, on the exterior shell of a space vehicle, not shown. The attitude control system 10 makes use of the electrical power system of the vehicle, which may be batteries, solar cells, nuclear generators, or other known-art devices, and is actuated and controlled by the space vehicle guidance system.

The tape 30 is carried on the reels 27 and 28 as described, and the reel 27 will be caused to rotate in stepwise increments when the motor 29 is energized. The spring-biased contacts 39 and 40 are constantly energized; and as rotation of the reel 27 brings a reaction motor 31 between the contacts 39 and 40, its ignition wire 38 is energized igniting the propellant 37. Ignition current is drawn from the power source only during the brief period in which the ignition wire 38 is igniting the propellant 37, after which the circuit is interrupted by destruction of the ignition wire 38.

The motors 16 and 24 will be energized on command to rotate both the frame 17 and casing 22 so that the thrust generated by the burning of the solid propellant motors 31 can be directed in the required direction to correct the pitch, roll, and yaw of the space vehicle.

The thrust of the system of FIGURE 1 will be directed outwardly of the casing 22 through the exhaust port 34 thus the thrust of the motors 31 shown more specifically in FIGURES 2 to 4 inclusive will be directed through the nozzles 36 and then through the exhaust port 34. The guide 32 will direct the tape 30 between the electrical contacts 39 and 40 so that current flowing through the ignition wire 38 will ignite the solid propellant 37 causing it to burn and provide a thrust during the burning thereof that is transferred outwardly of the casing 22 through the exhaust port 34.

The provision of the small motors 31, with each of the motors provided with a nozzle 36 which confines and properly directs the thrust produced by the burning of the solid propellant 37 positively assures that such thrusts will be directed outwardly of the casing 22 through the exhaust port 34.

It is believed that from the foregoing description, the structure involved and the manner of use thereof will be apparent to those skilled in the art; and it is to be understood that changes therein may be made provided such changes fall within the spirit of the invention and the scope of the appended claims.

Having thus described the invention, what is claimed as new and desired to be secured by Letters Patent is:

1. A solid propellant attitude control system for space vehicles comprising means for mounting said system on said vehicle, said system including a frame, a mounting means for rotating said frame 360 degrees, a case mounted in the frame and also adapted to be rotated 360 degrees, a pair of reels mounted in said case, a tape wound on said reels, means for activating one of said reels to wind the tape from one reel to the other reel, solid propellant charges mounted on said tape in equally-spaced relation to each other, and means for ignition of said charges to burn said charges to create directional thrusts outwardly of said casing.

2. An attitude control system, as in claim 1, wherein an ignition wire is embedded in each of said charges and means is provided for directing an electrical current through said wire to ignite said propellant.

3. An attitude control system, as in claim 1, wherein small motor cases having nozzles thereon are provided for said charges.

4. An attitude control system, as in claim 1, wherein small electric motors are provided for activating said frame, said casing, and said one of said reels.

5. An attitude control system, as in claim 1, wherein guide means for said tape is provided between said reels and said guide means has electrical contacts thereon that are adapted to energize the means for igniting said charges.

6. An attitude control system, as in claim 5, wherein the means for igniting said charges comprises an ignition wire and the electrical contacts are positioned to wipe the opposite ends of said wires for the energizing of said wire to ignite said charges.

References Cited by the Examiner
UNITED STATES PATENTS

| | | | |
|---|---|---|---|
| 691,500 | 1/1902 | Stenersen | 60—39.47 X |
| 2,172,163 | 9/1939 | Glowka | 60—35.6 |
| 2,403,730 | 7/1946 | MacNeille. | |

MARK NEWMAN, *Primary Examiner.*

A. L. SMITH, *Assistant Examiner.*